(12) United States Patent
Eriksson (10) Patent No.: US 7,537,095 B2
(45) Date of Patent: May 26, 2009

(54) CHOCKING APPARATUS

(76) Inventor: Bengt-Olov Eriksson, Backa 135, SE-790 23, Svärdsjö (SE)

( * ) Notice: Subject to any disclaimer, the term of this patent is extended or adjusted under 35 U.S.C. 154(b) by 582 days.

(21) Appl. No.: 10/542,066

(22) PCT Filed: Jan. 8, 2004

(86) PCT No.: PCT/SE2004/000009

§ 371 (c)(1),
(2), (4) Date: Mar. 9, 2006

(87) PCT Pub. No.: WO2004/078618

PCT Pub. Date: Sep. 16, 2004

(65) Prior Publication Data

US 2006/0145460 A1 Jul. 6, 2006

(30) Foreign Application Priority Data

Jan. 10, 2003 (SE) .................................... 0300023

(51) Int. Cl.
*B60T 3/00* (2006.01)

(52) U.S. Cl. .................. 188/32; 188/4 R; 280/765.1; 280/766.1; 414/401

(58) Field of Classification Search .................. 188/4 R, 188/5, 6, 7, 8, 32, 36; 280/762, 763.1, 764.1, 280/765.1, 766.1; 414/396, 401, 402, 584; 294/81.1, 81.2, 81.4, 81.41, 904

See application file for complete search history.

(56) References Cited

U.S. PATENT DOCUMENTS

| 3,321,046 | A | * | 5/1967 | Copper ........................ 188/4 R |
| 4,207,019 | A | * | 6/1980 | Cone .......................... 414/373 |
| RE33,242 | E | * | 6/1990 | Hipp et al. .................. 414/401 |
| 5,664,930 | A | * | 9/1997 | Ellis ........................... 414/401 |
| 5,896,957 | A | * | 4/1999 | Berends et al. ............... 188/32 |
| 5,901,816 | A | * | 5/1999 | Camilleri ..................... 188/32 |
| 7,032,720 | B2 | * | 4/2006 | Jette et al. .................... 188/36 |

FOREIGN PATENT DOCUMENTS

EP 0452519 10/1991

* cited by examiner

*Primary Examiner*—Christopher P Ellis
*Assistant Examiner*—John D. Walters
(74) *Attorney, Agent, or Firm*—Young & Thompson (57) ABSTRACT

An apparatus (1) for reliably blocking a vehicle (2) at a loading dock (3) includes a telescopic arm (4) that at one end (4A) is supported so as to be stationary but is pivotal about two axes (P1, P2) and that at the opposite end (4B) is provided with an engagement element (5) for effecting a blocking connection between the vehicle and the area of a loading dock. At the same time as the stationary end maybe provided at a safe position where it is practically completely out of the way when it comes to e.g. snow clearance and risk of being run into, the capability of pivotal movement and the telescopic design of the arm makes it possible to easily maneuver the engagement element into a blocking or restraining engagement from the outside of the vehicle.

14 Claims, 6 Drawing Sheets

CHOCKING APPARATUS

TECHNICAL FIELD

The invention relates generally to apparatuses that serve to prevent unintentional displacement of road freight vehicles or trucks and their load carriers, trailers or semi-trailers in connection with loading and unloading at a loading dock or the like.

BACKGROUND

There is a very serious risk of accidents occurring in association with the loading and unloading of trucks and trailer, when such loading/unloading is carried out by means of fork-lift trucks at a loading dock or loading bay. In such cases, a fork-lift truck may be driven onto the loading bed of the truck or trailer through a swingable ramp or leveller that is normally anchored at the loading dock. The truck and its load often weighs several tons and there is an apparent risk that a vehicle that is only blocked with its parking brake will be displaced just in association with driving onto the truck bed or the ramp. Naturally, the risk of sliding is greater during wintertime when the vehicle wheels may be positioned on snow or ice. However, loose gravel on asphalt may have the same effect during other seasons. Such an unintentional displacement of a truck when driving onto it may have very serious consequences, since there is a risk of the fork-lift truck overturning or partly or completely falling down between the loading dock and the vehicle.

Traditionally, road freight vehicles and/or their load carriers (such as trailers or semi-trailers) are therefore secured in position at a loading dock through chocking by means of loose wedges or chocks that are positioned in front of one or several wheels of the vehicle or load carrier. An example of such a manual chocking is disclosed in U.S. Pat. No. 6,336,525 B1. Such traditional chocking suffers from many drawbacks. On the one hand, it involves that the vehicle driver has to go round and manually position and secure chocks against the vehicle wheels and that the safety is therefore completely dependent upon the driver performing the chocking in the appropriate manner. A chock that is not properly driven in under the wheel may easily come loose and simply be pushed ahead in front of the wheel. Moreover, no immediate indication is given to the forklift driver, neither regarding the fact that chocking has really been performed nor whether it has been properly performed. It is also known to secure or restrain vehicles by means of straps or chains, but these methods are both complex and unsafe.

Fixed devices have also been developed for blocking one or several vehicle wheels in association with loading and unloading. These known devices include those that are rigidly connected to the driveway or truck parking surface—see e.g. DE 44 27 406; EP 0 937 669 A1; EP 1 120 371; U.S. Pat. Nos. 6,371,253 B1; and 5,531,557—or that are alternatively embedded in said driveway or truck parking surface, see e.g. EP 0 580 415 A1; and U.S. Pat. No. 5,553,987. The first mentioned variant inevitably causes problems in association with snow clearance work etc. Furthermore, it may easily become blocked or even damaged in case the road freight vehicle is maneuvered so that it assumes an incorrect position on the device. This means that in these cases fairly high precision is required when backing the road freight vehicle up to the loading dock. The last mentioned variant involves very high costs, partly on account of the fact that its design is relatively complex and expensive and partly since it requires that an accommodating space is formed in the truck parking surface and is appropriately drained.

Finally U.S. Pat. No. 5,743,697 describes a wheel chocking apparatus that is indeed supported at the front of the loading dock, facing the vehicle, but that likewise, in all positions, interferes essentially with the driveway or truck parking surface and is an obstacle to snow clearance and other maintenance work at the parking surface. It is moreover intended to be introduced between the wheels of one wheel axle of the road freight vehicle in association with backing the vehicle up toward the loading dock Since it has a fixed width, it requires high precision during backing, and in addition thereto it does not permit any substantive variations in the axle width or track of the road freight vehicles.

SUMMARY OF THE INVENTION

The invention eliminates the above discussed disadvantages in an efficient and appropriate manner.

A general object of the invention is to provide a practically useful solution to the problem of efficiently and securely preventing unintentional displacement of a road freight vehicle in association with loading and/or unloading at a loading dock.

A basic object of the invention is therefore to provide an improved apparatus that effects reliable blocking or restraining of a vehicle at a loading dock and Eat is simultaneously simple to handle and interferes minimally with the loading dock as well as with the truck parking surface. Briefly, in accordance with the invention, this is achieved by means of a telescoping arm that at one end thereof is supported so as to be stationary but pivotal about two axes and that at the opposite end is provided with an engagement means for effecting a blocking connection between a vehicle and a loading dock area. At the same time as the stationary end may be provided at a safe position where it is practically completely out of the way when it comes to e.g. snow clearance and risk of collision, the capability of pivotal adjustment and the telescoping design of the arm make it possible to easily maneuver the engagement means into blocking engagement from the outside of the vehicle.

According to one embodiment of the invention the arm is supported with its stationary end at the loading dock and the engagement means provided at the opposite end may be brought into engagement with a part that is fixed to the vehicle. With such a design, practically all existing road freight vehicles may be blocked from unintentional displacement and still no alterations will have to be made to the actual vehicle.

According to another embodiment of the invention the arm is supported with its stationary end on the road freight vehicle, whereas the engagement means may be brought into engagement with an anchor provided in connection with the loading dock. In this embodiment, the area around the loading dock is maintained completely free from obstructing or interfering parts.

According to a practical embodiment of the invention, the arm is supported in the area of a front surface of the loading dock that faces the road freight vehicle and is pivotal about a vertical and a horizontal axis. This design provides for a simple maneuverability and at the same tine, the arm may be supported below the loading surface of the loading dock and in the applicable case even under the same, just inside the front surface.

In a suitable configuration, a generally wedge-shaped chock is used as an engagement means that is intended to engage a vehicle wheel. By configuring the chock so that it is capable of restricted pivoting about at least one axis, a good possibility is provided for adapting it to different vehicles.

In a practical embodiment, the arm has two tubes or pipes that are telescopically displaceable in relation to each other. A piston-cylinder assembly is received in one of the tubes so that its cylinder and its piston rod are connected to one each of the tubes. In this way, a simple maneuverability of the apparatus is provided for.

At a position between its ends, the arm is connected to a support device that permits simple pivoting of the apparatus about the axes for positioning it in a blocking position and in an inactive position, respectively. The support device may consist of a support leg that is adjustable in height to permit pivoting of the arm about a horizontal axis and that carries a pivoting support wheel for allowing pivoting of the arm about a vertical axis. Alternatively, the support device may consist of a balancing spring that engages the arm to permit balanced-out pivoting of the arm about both axes.

Further possibilities of adaption and safety are achieved by providing an adjustable side stop on the engagement means, said side stop being intended to engage the side of a vehicle wheel.

By supporting the arm with its first end positioned at an essential distance above a truck parking surface said surface will be maintained completely free.

These and other objects of the invention are achieved by means of the invention as it is defined in the accompanying patent claims.

DESCRIPTION OF THE DRAWINGS

Further objects, features and advantages of the invention as well as fierier embodiments thereof are specified in the patent claims and in the following detailed description taken together with the accompanying drawings, in which:

DESCRIPTION OF EMBODIMENTS

Referring to the drawing figures the basic principles of the invention will now be described by means of embodiments thereof, and at the same time, the differences in comparison with the conventionally employed technique will be clarified.

The invention and its basic principles will initially be described with reference to the partly schematical illustrations of FIGS. 1A-B and 2A-B. Specifically, they illustrate a presently preferred embodiment of a chocking apparatus 1 according to the invention, mounted in the area of a loading dock 3. On a surface 20 where trucks are to be parked, here also referred to as a truck parking surface or driveway, a very schematically illustrated road freight vehicle 2 has been backed up towards the loading dock 3 that is normally provided with rubber bumpers 3D for taking up forces from possible collisions caused by backing. In order to bridge the distance between the loading surface 3B of the loading dock 3 and the loading bed, not illustrated, of the road freight vehicle or truck 2, a bridge or leveller 3C (indicated only in FIG. 1A) may be pivotally supported in association with the front side 3A (see FIG. 1B) of the loading dock 3 facing the road freight vehicle.

The chocking apparatus 1 consists of a telescopically extendable and retractable arm 4 that by a first end 4A thereof is carried by a support 7. The support 7 is here illustrated in the form of a concrete plinth, the purpose of which is to support the loading dock 3 in the area close to its outer front side 3A. Specifically, an arm bracket 17 is firmly attached to the support 7. At its free end the arm bracket 17 has a bearing sleeve 18 in which a first portion 19A of an arm holder 19 is journalled for rotation about a first vertical axis P1, see especially FIGS. 2A and 2B. A second portion 19B of the arm holder 19 is in turn pivotally connected to the first arm holder portion 19A, for pivoting about a second horizontal axis P2, and is on its part firmly connected to the first end 4A of the arm 4. In this way, the arm 4 is adjustable about the first and second axes P1 and P2, respectively, for positioning the arm in an active and an inactive position, respectively, as will be described more closely below.

The telescopically extendable/retractable arm 4 consists of first and second tubes or pipes 14 and 15, respectively, that are positioned one in the other so that they are telescopically displaceable. Specifically, the arm 4 comprises a first outer tube 14 that forms the first stationary supported end 4A of the arm and that displaceably receives a second, inner tube 15 forming a free second end 4B of the arm. In the second end 4B of the arm is carried an engagement means 5 that is intended to releasably engage a part that is fixed to the vehicle 2. More specifically, the engagement means 5 comprises a chock 6 having a generally curved or bow shaped surface 6A that is intended to be brought into contact with a vehicle wheel 2A in order to block it. A modified embodiment of the engagement means will be described more closely below, in association with FIGS. 3A and 3B.

A hydraulic piston and cylinder assembly 16 is received in the first tube 14 in order to provide for the displacement between the tubes 14, 15. In the illustrated embodiment the piston and cylinder assembly 16 is arranged so that its cylinder 16B protrudes through the open first end 4A of the arm 4 and with its rear end is connected to the second arm holder portion 19B. Furthermore, the piston rod 16A of the piston and cylinder assembly 16 is connected to the second tube 15. No hydraulic connections or control means for operating the piston and cylinder assembly 16 are illustrated on the drawings, since the practical design thereof does not form any part of the actual invention. These parts as well as the supply of working fluid are performed in the manner that is most suitable for each application and in a manner that is obvious to the skilled practitioner within is area.

In order to facilitate handling of the arm 4, that is the pivoting thereof about the two axes P1, P2, the first outer tube 14 is provided with a first handle 10A, and a second handle 10B is provided in the area of the second free end 4B of the arm 4. The second handle maybe provided at an outer end of the inner tube 15 and/or at the engagement means 5. The first and second handles 10A and 10B, respectively, are both formed as a loop to provide a good grip for one or two hands.

Figure 3A:
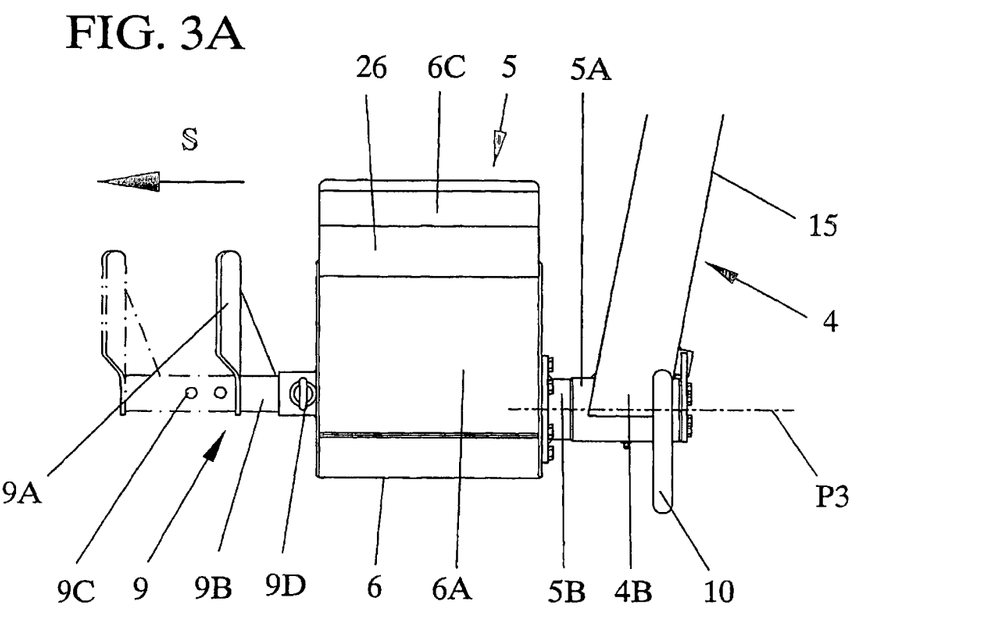
FIG. 3A is a plan view from above of a modified engagement means of the chocking apparatus according to the invention.
Figure 3B:
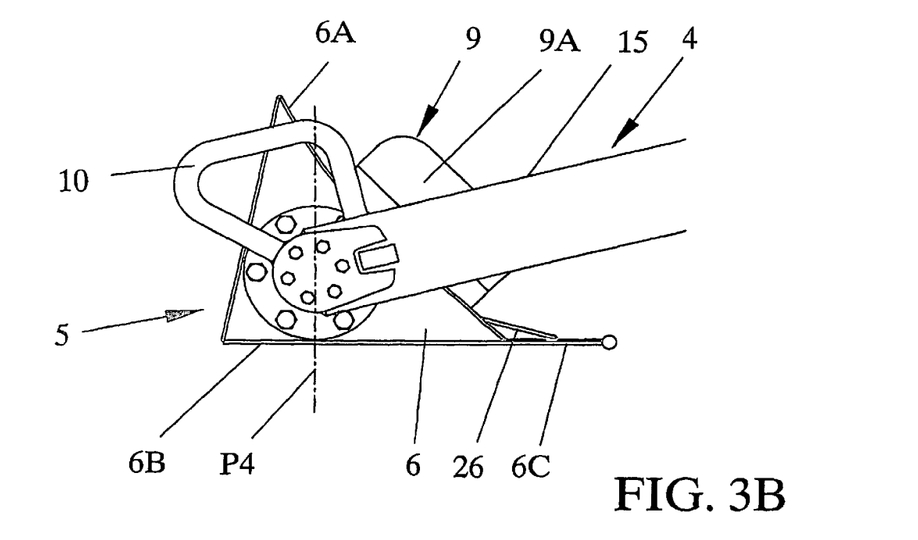
FIG. 3B is a plan view from one side of the engagement means of FIG. 3A.

FIGS. 3A and 3B illustrate in detail a modified or supplemented embodiment of the engagement means 5 that is provided at the second end 4B of the arm 4 that is telescopically extendable and retractable, respectively. Here, like in the embodiment illustrated in FIGS. 1A-B and 2A-B the engagement means 5 consists of a generally wedge shaped chock 6 that is intended for engaging one of the wheels 2A of the vehicle and that is provided with a curved engagement surface 6A that is intended to be brought into direct engagement with the circumference of a vehicle wheel 2A. The curved surface 6A of the chock 6 has a larger radius than that of a vehicle wheel with which it is intended to cooperate, to provide a secure contact therebetween. Furthermore, the chock 6 has a substantially planar bottom surface 6B that in the active position of the chocking apparatus 5 is intended to rest substantially flat on the truck parking surface 20. To secure this irrespective of how far the arm 4 is extended when the chock 6 is in the blocking engagement position, the chock 6 is capable of limited pivotal movement about an axis P3. To attain the desired effect the chock does normally not have to be pivotal in a larger area than approximately 5°. The pivoting is achieved by means of a pin 5B that is fixed to the chock and that is pivotally journalled in a bearing sleeve 5A carried at the second end 4B of the arm 4.

In this embodiment the bottom surface 6B of the chock 6 is extended by a portion 6C on its side that in the active position faces the loading dock 3, and between the extended portion 6C and the curved surface 6A there is provided a bracing iron 26. This will have the result that in the below described engagement position the wheel 2A of the vehicle 2 will be positioned on the extended portion 6C of the bottom surface 6B, so that the weight of the road freight vehicle is used in a very effective way to maintain the chock 6 in position.

At one side of the curved surface 6A there is provided a side stop 9 that consists of a stop plate 9A. The stop plate is supported on a shaft 9B that is displaceably supported in the chock 6. The side stop 9 is adjustable in a direction S, towards and away from, respectively, the curved surface 6A, so that it may be brought into engagement with the side of a vehicle wheel 2A. The adjustment of the side stop 9 is here achieved by means of a series of holes 9C being provided in the displaceable shaft 9B. A pin 9D that is attached to the chock 6 is insertable into said holes in order to lock the side stop 9 in the desired position. The purpose of this side stop 9 is to prevent the torque resulting from the later described activation of the chocking apparatus 1 from causing an undesirable displacement or twisting of the chock. Finally, the chock 6 may also, in a manner that is not specifically disclosed, be capable of limited pivotal movement about a further axis P4, indicated in FIG. 3B. The object thereof is to bring the chock 6 to engage the vehicle wheel 2B in a straight position, irrespective of how far the arm 4 is extended in the engagement position, and in other words to prevent the oblique or tilted position of the chock 6 that is disclosed in the alternative engagement position that is illustrated by dash dot lines in FIGS. 1B and 2B.

Figure 1A:
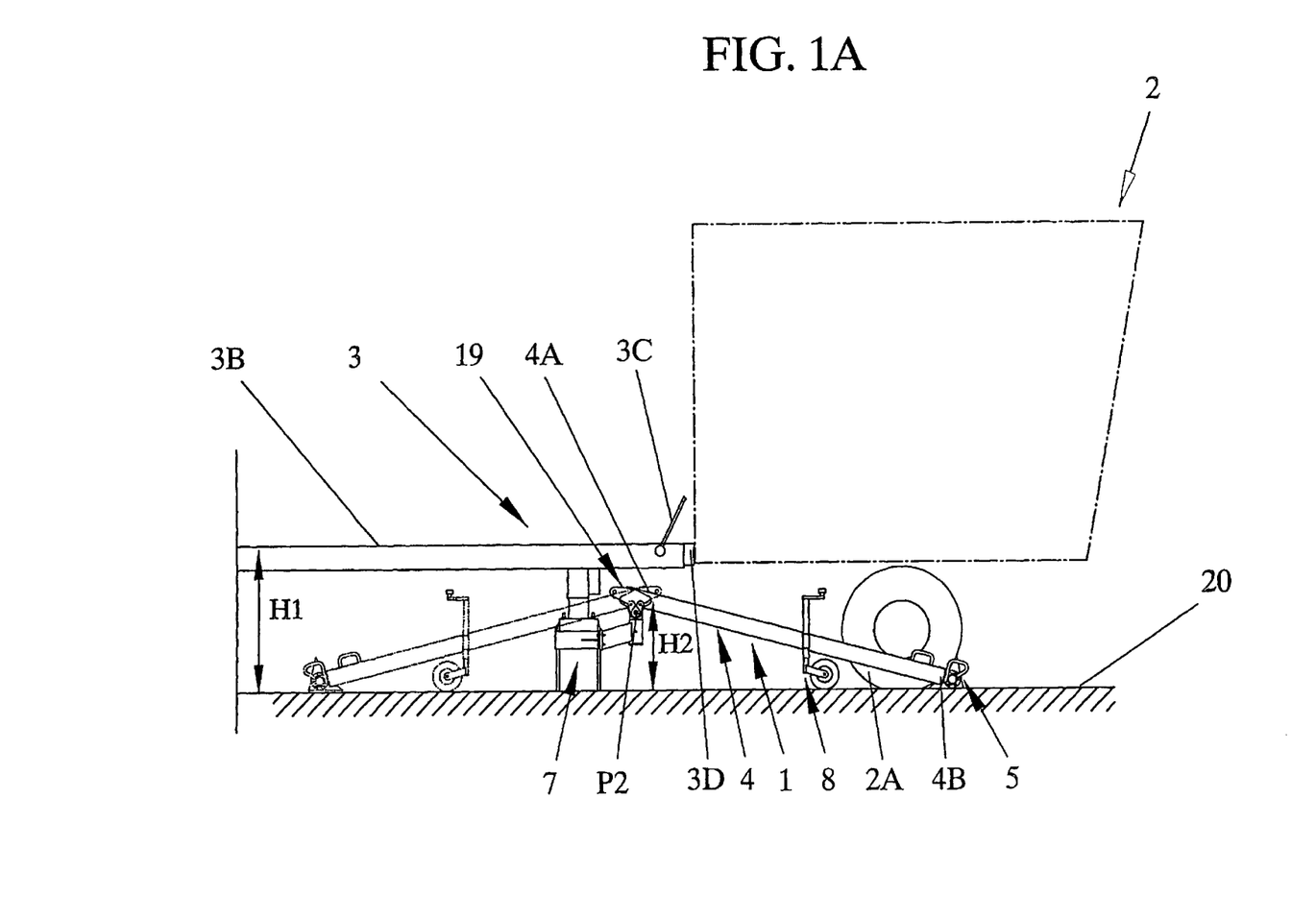
FIG. 1A is a schematic illustration from one side of a first embodiment of a chocking apparatus according to the invention, in a position blocking a road freight vehicle at a loading dock.
Figure 1B:
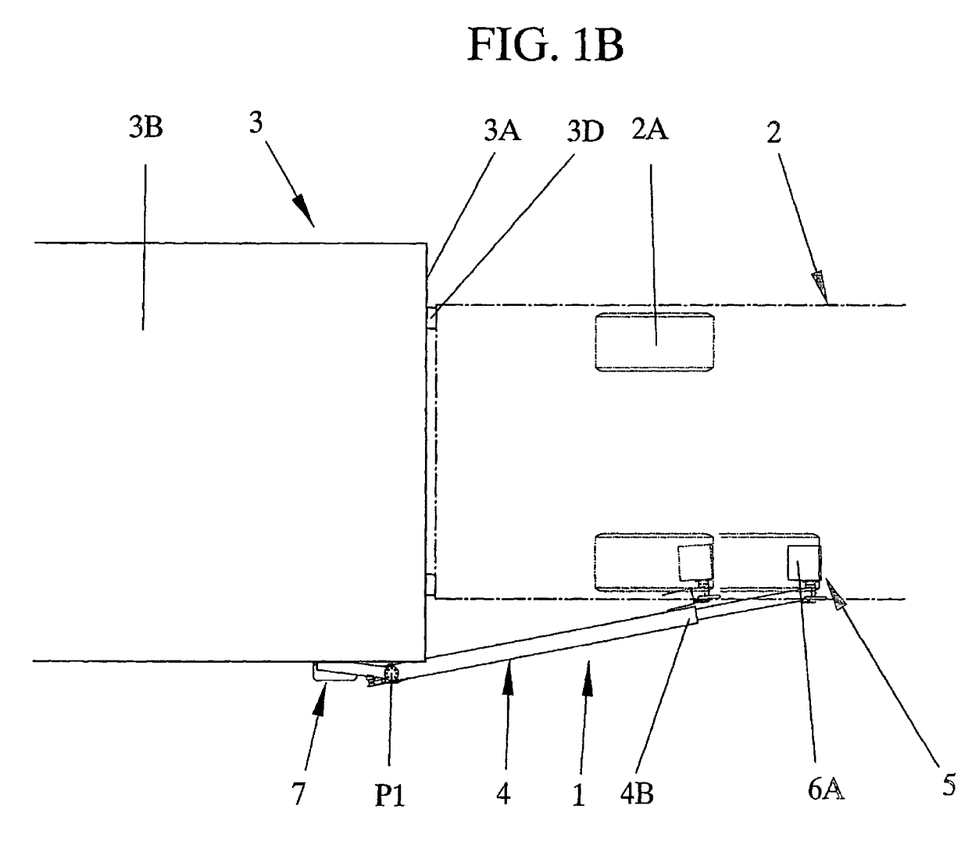
FIG. 1B is an illustration from above of the embodiment of the chocking apparatus according to the invention that was illustrated in FIG. 1A.
Figure 2A:
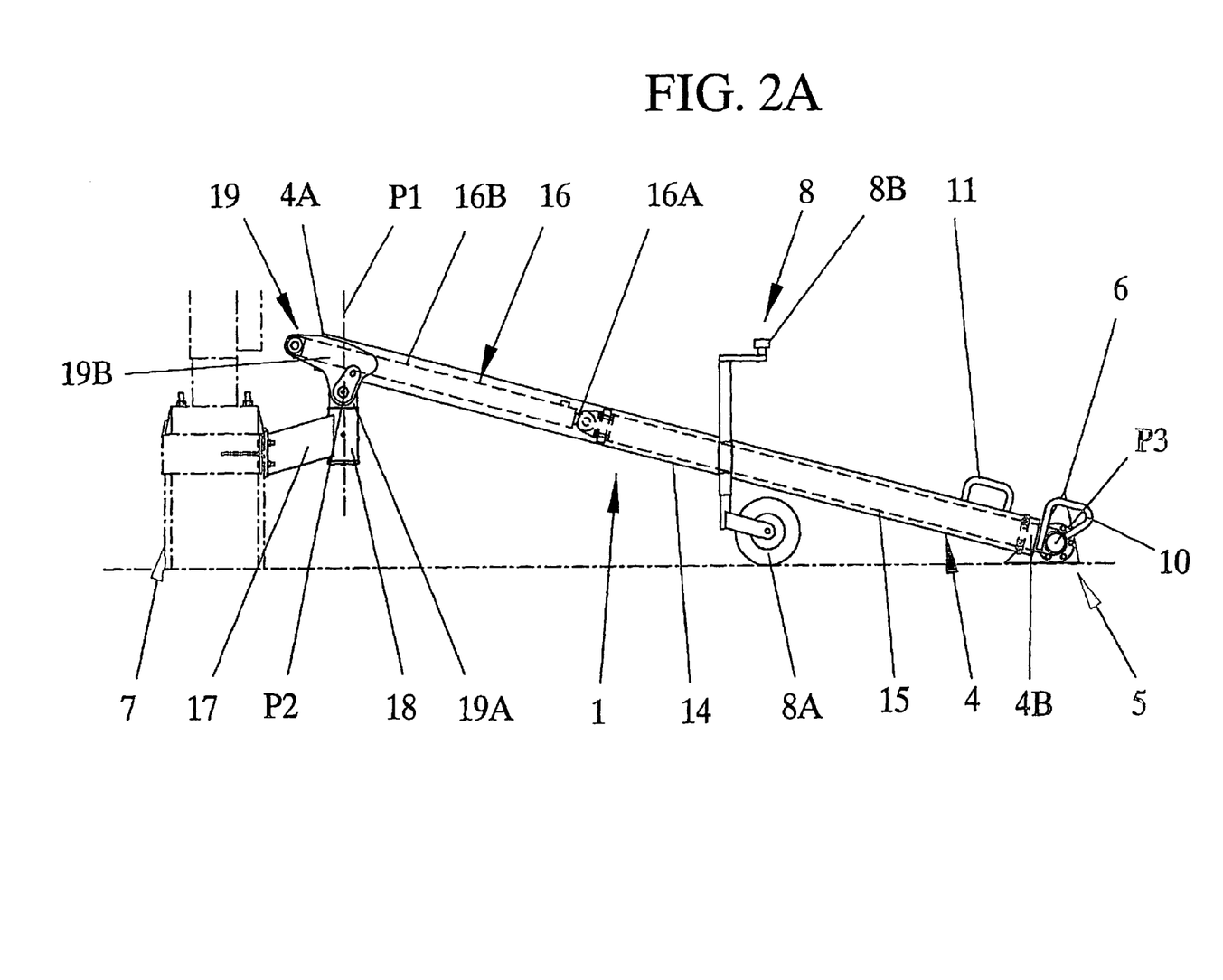
FIG. 2A is a detailed view from one side of the fist embodiment of the chocking apparatus according to the invention that was illustrated in FIGS. 1A and 1B.
Figure 2B:
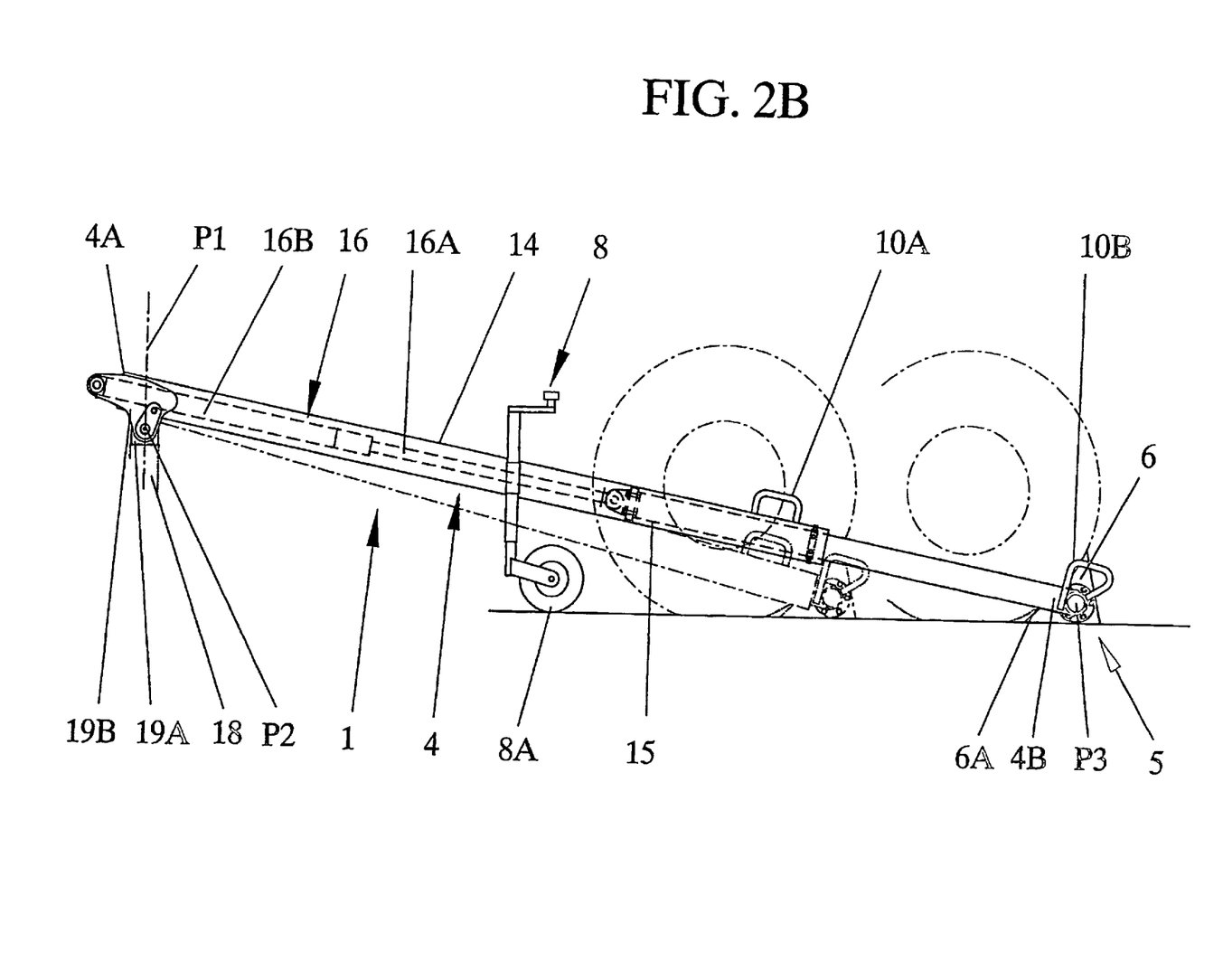
FIG. 2B is a view corresponding to FIG. 2A and illustrating two alternative engagement positions of the chocking apparatus.

To enable easy movement of the arm 4 between its active engagement position and an inactive storage position where it is placed out of the way adjacent the loading dock 3 or underneath it, as is illustrated in FIG. 1A, the arm 4 is connected to an adjustable support device 8 at a position between its first and second ends 4A, 4B. This support device permits controlled pivoting of the arm about the first and second axes P1, P2. In the embodiment illustrated in FIGS. 1-3 the adjustable support device consists of a support leg 8 that by means of a crank 8B is adjustable in height to permit pivoting of the arm 4 about the second horizontal axis P2 and that in a lower end thereof carries a pivoting support wheel 8A for allowing pivoting of the arm 4 about the first vertical axis P1. The support leg 8 may preferably be of the type that is used on ordinary one axle trailers. For that reason, the crank mechanism or other parts thereof are not described in detail here.

In order to maintain completely free the parking surface 20 for the road freight vehicle 2 the telescopically extendable and retractable, respectively, arm 4 is arranged so that it is supported on the support 7 with its first end 4A positioned at a substantial distance H2 above the parking surface 20 or driveway. Preferably the arm 4 is supported on the support 7 with its first end 4A positioned at a distance H2 above the driveway or parking surface 20 that exceeds half the height H1 between the parking surface and the loading plane 3B of the loading dock 3. In this way, the surface directly in front of the loading dock 3 may be kept completely free in the cases where there exists a free space under the loading dock 3. This is accomplished since the arm 4 in its inactive position, supported on the support leg 8, may be swung completely in under the loading dock 3, as is illustrated with dash dot lines in FIG. 1A. In the situations where there is no free space available under the loading dock 3 the arm 4 is swung fully in towards the loading dock so that it is extended directly along the front surface 3A of the loading dock and occupies minimum space.

When using the described chocking apparatus 1 the following procedure is used. A vehicle 2 that is to be loaded or unloaded is backed in towards the loading dock 3 until it contacts the rubber bumpers 3D at the loading dock 3. The chocking apparatus 1 is then normally in the stowed storage position, with the arm 4 swung in under the loading dock 3, and supported on the support leg 8. For illustrative purposes the arm 4 is illustrated in FIG. 1A in its position swung fully in under the loading dock 3, but normally it is only swung in a short distance under the dock, so that it is easily reached. As is illustrated in the drawing, the arm 4 is raised slightly by means of the support leg 8 so that the engagement means 5 is positioned slightly above the ground surface 20. With the vehicle parked against the loading dock 3 one of the handles 10 or 11 is gripped and the arm 4 is swung out and around so that the engagement means 5 is positioned just beside a vehicle wheel 2A. Then the arm 4 is operated by means of the piston and cylinder assembly 16 so that he engagement means 5 is placed in position to be swung in front of the vehicle wheel 2A in question. The piston and cylinder assembly 16 is operated, in a manner that is known per se, by means of a remote control, a control unit connected by cable or a fixed panel provided at the loading dock. None of these control units is shown on the drawings and they are not in themselves described herein since they may be of a configuration that is obvious to the skilled practitioner and since the detailed design thereof does not form part of the invention.

When the length of the arm 4 has been adjusted it is pivoted so that the engagement means 5 is positioned just in front of the vehicle wheel 2A, whereupon it is lowered down by means of the support leg 8 adjustment, so that the chock 6 rests on the ground 20. In the applicable case the side stop 9 is adjusted so that its plate 9A engages or is positioned immediately adjacent the side of the vehicle wheel 2A, and then the piston and cylinder assembly 16 is operated again so that the chock 6 is forcefully pulled in towards and, especially in the embodiment with its extended bottom 6C, in under the vehicle wheel 2A. By using the weight of the vehicle 2 to lock it the force requirement is reduced. In other words, the piston and cylinder assembly 16 will normally not have to apply any extreme force, and therefore no overdimensioning thereof or of the arm 4 will be needed. For the purpose of completely unloading the piston and cylinder assembly 16 in the blocking position a mechanical lock, e.g. in the shape of a non-illustrated pin or the like, may be provided between the telescopically displaceable tubes 14 and 15, respectively, of the arm 4.

When the chocking apparatus 1 has been activated in this manner the pivotal bridge 3C of the dock or bay 3 may be lowered down so that loading or unloading may be commenced. Since the piston and cylinder assembly 16 continuously pulls the chock 6 towards the dock 3, supported by the weight of the vehicle, the vehicle 2 can be reliably maintained in position against unexpected movements, so that the loading or unloading may be performed very safely. When loading/unloading has been terminated the arm 4 is extended a bit by means of the piston and cylinder assembly 16. Then the arm 4 may be swung away to the inactive position again when the support leg has been adjusted upwardly so that the, chock 6 hangs free above the ground 20.

By means of the above description it shall now be obvious that the solution as suggested by the invention has the effect that a reliable chocking apparatus may be provided that is comparatively inexpensive and easy to handle.

Figure 4:
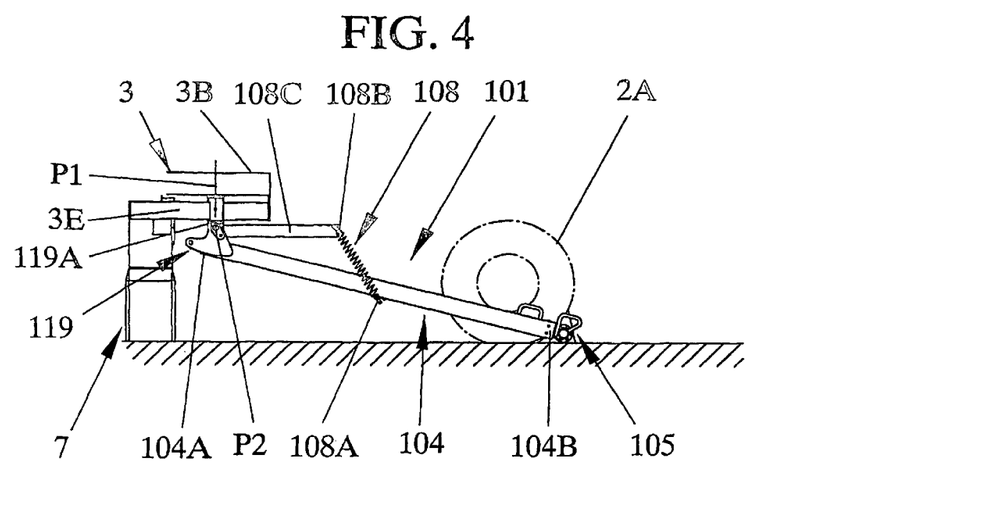
FIG. 4 is a partly schematical illustration from one side of a second embodiment of a chocking apparatus according to the invention, in its position blocking a road freight vehicle at a loading dock.

In FIG. 4 is illustrated a second embodiment of the chocking apparatus 101 of to the invention. In this case the arm 104 is supported directly under the loading surface 3B of the loading dock 3, by a substantially horizontal arm 3E that may be part of an impact protector at the dock 3. In this embodiment the controlled support device consists of a balancing spring 108 extended between a bracket 108A at the arm 104 and a bracket 108B at a supporting arm 108C that is firmly attached to the first portion 119A of the arm holder 119. Said arm holder 119 corresponds to the one of the first embodiment, except that it is in principle turned upside down. Hereby, balanced out pivoting of the arm 104 about the first and second axes P1, P2 is enabled. The balancing spring 108 replaces the support leg of the first embodiment so that maneuvering of the arm 104 between active and inactive positions is entirely independent from the parking surface 20. In this embodiment the parking surface will therefore be completely free in the inactive position, even in the case where no free space is available under the loading dock, since the arm may hang freely alongside the loading dock front. Otherwise, the chocking apparatus 101 corresponds to that of the first embodiment.

Figure 5:
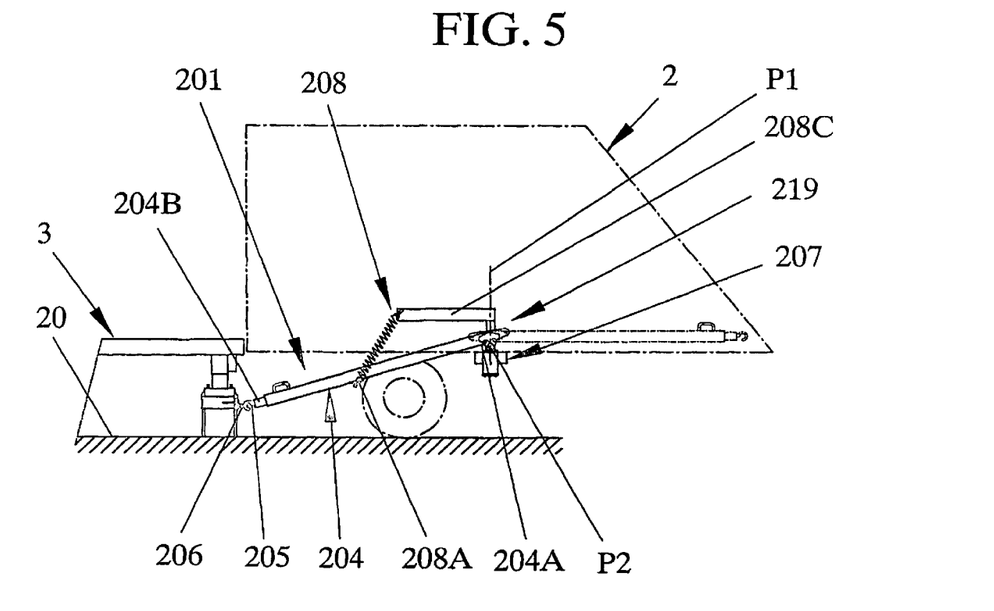
FIG. 5 is a schematic illustration from one side of a third embodiment of a chocking apparatus according to the invention, in its position blocking a road freight vehicle at a loading dock.

Finally, FIG. 5 illustrates a third embodiment of the chocking apparatus 201 of the invention, where the arm 204 that is telescopically extendable and retractable, respectively, with the first end 204A thereof is supported stationary on the road freight vehicle or truck 2 and where an engagement means 205 at its other end 204B may be brought into releasable engagement with an anchor 206 that is fixed relative to the loading dock 3. By means of an arm holder 219 that likewise substantially corresponds to that of the first embodiment, the first end 204A of the arm 204 is supported at a support 207 that is connected to the fame, not specifically designated, of the vehicle 2. In the inactive position, the arm 204 may therefore be secured to the vehicle frame, extended along the same, as is schematically illustrated with dash dot lines in the figure. In this embodiment it is preferable to employ the support device designed as a balancing spring 208, disclosed in association with FIG. 4, that here too engages the arm 204 and that has a supporting arm 208C supported at the first portion (not specifically illustrated) of the arm holder 219.

In this case an engagement means is provided in the other end 204B of the arm 204, said engagement means here being illustrated as a simple hook 205 that in the active position may be hooked onto an anchor 206 formed as a loop attached to the loading dock 3 support 7. Maneuvering of the arm 204 is basically performed in the same manner as that described above. The advantage of this design is that the loading dock area becomes completely free, and that the design may in principle be employed at all loading and unloading sites without requiring any other rebuilding thereof than the provision of a fixed point or anchor point. In certain cases, this makes up for the disadvantage that each vehicle will have to be provided with a chocking apparatus of its own.

Although the invention has been described above with reference to the specific embodiments that are illustrated in the drawings, it shall be emphasized that it also covers other variants employing the basic principles of the invention. Within the scope of the invention it is therefore likewise possible to employ other, in themselves known, designs for e.g. the arm support device and/or for the engagement means and for the fixed anchor therefore in the embodiment according to FIG. 5. The invention is also not restricted to the described hydraulic operation of the arm, but likewise covers embodiments with manual operation, e.g. by means of eccentric and lever or crank operation with screw and nut or with gear rack, of the kind that is used e.g. in an ordinary jack. Embodiments with electric drive means are also covered by the invention.

In certain cases, especially when smaller delivery trucks etc. are concerned, it is common that each truck is provided with a ramp or tail lift that may be raised or lowered and that bridges the distance to the dock. The invention may be employed without restriction in all cases, irrespective of the type of device for bridging said distance, and generally by all kinds of loading docks. In order to avoid problems caused by torques that act due to the fact that the chocking apparatus in its active position applies a force that is directed obliquely outwardly from the vehicle, it may in all embodiments be produced having two arms that come into engagement from one side each so that the acting torques cancel each other.

Finally, details from the different illustrated embodiments may be combined with each other. Thus, the invention covers for instance also an embodiment, not illustrated, where the chocking apparatus according to the first embodiment is provided with an engagement means that corresponds to the hook of the third embodiment, and that may be brought into engagement with a fixed anchor, corresponding to the loop of the third embodiment, attached to the frame of the vehicle.

It will be understood by those skilled in the art that various modifications and changes may be made to the present invention without departure from the scope thereof, which is defined by the appended claims.

The invention claimed is:

1. Apparatus (1;101) for preventing unintentional movement of a road freight vehicle (2) in association with loading/unloading at a loading dock (3), characterized by:—an arm (4; 104 that is telescopically extendable and retractable, respectively;

the telescopically extendable and retractable arm being stationary supported at a first end (4A; 104A) thereof and being pivotal about two axes (P1, P2) in association with said first end; and the telescopically extendable and retractable arm being provided with an engagement means (5; 105) in a second end (4B; 104B; 204B) thereof.

2. Apparatus (1; 101) according to claim 1, characterized in that:
the telescopically extendable and retractable arm (4; 104) with the first end (4A; 104A) thereof is stationary supported in association will the loading dock (3).

3. Apparatus (1; 101) according to claim 2, characterized in that the first end (4A; 104A) of the telescopically extendable and retractable arm (4; 104) is stationary supported on a support (7) provided in association with a front surface (3A) of the loading dock (3) that faces the truck (2) during loading/ unloading and in that to association with the support, the arm (4; 104) is pivotally journalled about a vertical and a horizontal axis (P1 and P2, respectively).

4. Apparatus (1; 101) according to claim 1, characterized in that the second end (4B; 104B) of the telescopically extendable and retractable arm (4; 104) is provided with an engagement means (5; 105) comprising a generally wedge-shaped chock (6; 106) and in that the chock is capable of limited pivoting about at least one axis (P3, P4).

5. Apparatus (1; 101) according to claim 4, characterised m that the telescopically extendable and retractable arm (4; 104; 204) consists of first and second tubes (14 and 15, respectively) that are telescopically displaceable one in the other, in that a hydraulic piston and cylinder assembly (16) is received in the first tube (14) and with its cylinder (16B) and with its piston rod (16A), respectively, is connected to the first and second tubes, respectively.

6. Apparatus (1; 101) according to claim 1, characterized in that at a position between its first and second ends (4A; 104A; 4B; 104B) the telescopically extendable and retractable arm (4; 104) is connected to an adjustable support device (8; 103) permitting controlled pivoting about the first and second axes (P1, P2).

7. Apparatus (1) according to claim 6, characterized in that the adjustable support device consists of a support leg (8) that is adjustable in height in order to permit pivoting of the arm (4) about a second horizontal axis (P2) and that in a lower end thereof carries a pivoting support wheel (8A) for permitting pivoting of the arm (4) about a first vertical axis (P1).

8. Apparatus (101) according to claim 6, characterized in that the adjustable support device consists of a balancing spring (108) engaging a bracket (108A) at the arm (104) in order to permit balanced-out pivoting of the arm (104) about the first and second axes (PI, P2).

9. Apparatus (1; 101) according to claim 5, characterized in that the chock (6; 106) has a curved surface (6A; 106A) and a side stop (9; 109) that is provided on one side of the curved surface and that is adjustable in a direction (S) towards and away from, respectively, the curved surface.

10. Apparatus (1; 101) according to claim 2, characterized in that the second end (4B; 104B) of the telescopically extendable and retractable arm (4; 104) is provided with an engagement means (5; 105) comprising a generally wedge-shaped chock (6; 106) and in that the chock is capable of limited pivoting about at least one axis (P3, P4).

11. Apparatus (1; 101) according to claim 3, characterized in that the second end (4B; 104B) of the telescopically extendable and retractable arm (4; 104) is provided with an engagement means (5; 105) comprising a generally wedge-shaped chock (6; 106) and in that the chock is capable of limited pivoting about as least one axis (P3, P4).

12. Apparatus (1; 101) according to claim 1, characterised in that the telescopically extendable and retractable arm (4; 104) consists of first and second tubes (14 and 15, respectively) that are telescopically displaceable one in the other, in that a hydraulic piston and cylinder assembly (16) is received in the first tube (14) and with its cylinder (16B) and with its piston rod (16A), respectively, is connected to the first and second tubes, respectively.

13. Apparatus (1; 101) according to claim 2, characterised in that the telescopically extendable and retractable arm (4; 104) consists of first and second tubes (14 and 15, respectively) that are telescopically displaceable one in the other, in that a hydraulic piston and cylinder assembly (16) is received in the first tube (14) and with its cylinder (16B) and with its piston rod (16A), respectively, is connected to the first and second tubes, respectively.

14. Apparatus (1; 101) according to claim 3, characterised in that the telescopically extendable and retractable arm (4; 104) consists of first and second tubes (14 and 15, respectively) that are telescopically displaceable one in the other, in that a hydraulic piston and cylinder assembly (16) is received in the first tube (14) and with its cylinder (16B) and with its piston rod (16A), respectively, is connected to the first and second tubes, respectively.

* * * * *